United States Patent

[11] 3,615,707

[72] Inventor William F. Filz
Portland, Oreg.
[21] Appl. No. 20,723
[22] Filed Mar. 18, 1970
[45] Patented Oct. 26, 1971
[73] Assignee North Pacific Canners & Packers, Inc.
Portland, Oreg.

[54] HERMETICALLY SEALED CONTAINER WITH READILY DETACHABLE PROTECTIVE COVER
7 Claims, 4 Drawing Figs.
[52] U.S. Cl. .................................................. 99/171 S,
99/171 C, 99/171 LP, 206/46 F, 229/43
[51] Int. Cl. .................................................. B65b 25/00
[50] Field of Search ................................................ 99/171 R,
171 LP, 171 S, 171 C, 192; 206/46 F, 46 R, 56 A;
229/43, 51 IS, 2.5; 150/.5; 220/41

[56] References Cited
UNITED STATES PATENTS
| | | | |
|---|---|---|---|
| 3,044,610 | 7/1962 | Tupper | 206/46 R |
| 3,158,491 | 11/1964 | Farrell et al. | 99/192 X |
| 3,298,505 | 1/1967 | Stephenson | 99/171 S X |
| 3,438,483 | 4/1969 | Miller et al. | 99/171 C X |

Primary Examiner—Frank W. Lutter
Assistant Examiner—Steven L. Weinstein
Attorney—Buckhorn, Blore, Klarquist and Sparkman ABSTRACT: A hermetically sealed frozen food container includes a dishlike tray of high-density polyethylene, a lip extending from the upper peripheral surface of the tray, a laminated plastic hermetically sealed closure member comprising a lower layer of polyethylene and an upper layer of polyester resin, the lower layer of polyethylene being heat sealed to the upper surface of the lip on the tray, and a fiberboard cover disposed above the closure member and adapted to protect the same and serve as a surface for advertising and other printed matter. The fiberboard cover has two downwardly and inwardly bent flanges on opposed edges thereof, the flanges being adapted to fold under the lips on the tray on the sides thereof in register with the flanges. The flanges are adhered to the undersides of the lip along the sides of the tray with which they are in register. The unflanged edges of the cover are unattached to the lip along the sides in register with them. The cover is deeply scored along the lines of fold of the flanges, whereby the major portion of the cover may be readily detached from the container merely by tearing the same along such scored lines, the flanges thereafter remaining adhered to the undersides of the lip.

PATENTED OCT 26 1971

3,615,707

WILLIAM F. FILZ
INVENTOR

BY
BUCKHORN, BLORE, KLARQUIST & SPARKMAN
ATTORNEYS

HERMETICALLY SEALED CONTAINER WITH READILY DETACHABLE PROTECTIVE COVER

BACKGROUND OF THE INVENTION

This invention relates to food packages of the general kind used for packaging frozen foods, and more particularly, to such packages wherein the frozen food is hermetically sealed.

The use of high-density polyethylene trays is common in the packaging of frozen foods. The sealing of such packages, however, has posed a problem. The usual such package is provided with a cover or lid of fiberboard which is adhesively secured to a lip around the upper portion of the tray. Such a seal is not a hermetic seal and thus permits the passage of moisture therethrough as the storage temperature varies slightly. This tends to pump both air and moisture in and out of the package, permitting the moisture to condense as frost on the container and the contents to deteriorate.

A further problem connected with such trays is that of making them suitable for immersing in hot or boiling water to enable the housewife to thaw the contents without theretofore removing such from the tray.

Some such prior trays have incorporated an adhesively sealed fiberboard cover on the tops thereof, but the use of such sealing lids has posed a danger of contaminating the product by the adhesive used to form the seal. On the other hand, where separate inner sealing members have been used, the protective cover of fiberboard has been difficult to remove.

Accordingly, it is the primary object of the present invention to provide a hermetically sealed, yet easily opened semirigid container for frozen foods, which container will provide optimum protection for the product against the deteriorating effects of temperature cycling while the product is in the frozen state, yet will permit the contents to be protectively thawed while in the container merely by placing such in hot or boiling water.

It is a further object of the present invention to provide such a container having an easily removed fiberboard lid, which lid will provide a maximum amount of printing surface for advertising and other printed matter.

It is a still further object of the present invention to provide such a container with a peelable clear plastic film undercover which will provide a hermetic seal and will also make possible a "thaw-in" package, i.e., one in which the product can be thawed while remaining in the package.

It is a still further object of the present invention to provide such container which utilizes a form-sustaining or semirigid plastic tray formed from roll stock, high-density polyethylene.

It is a still further object of the present invention to provide such a container that will be competitive in cost with fiber boxes, paper cartons overwrapped with wax paper, and other types of printed paper cartons.

It is a still further object of the present invention to provide such a container that will capitalize upon the housewife's ready acceptance of plastic materials as packaging for the foods and especially, for the frozen foods she buys.

SUMMARY OF THE INVENTION

In accordance with these objects, I have provided a hermetically sealed frozen food container having a dishlike tray of form-sustaining plastic, a lip extending from the upper peripheral surface of the tray, and a hermetically sealed flexible, transparent plastic closure member comprising at least one layer of heat-sealable plastic, which layer is heat-sealed to the upper surface of the lip completely around the tray.

A fiberboard protective cover is disposed above the closure member, freely overlying the same, and such cover has two downwardly and inwardly bent flanges on opposed edges thereof. Such flanges are adapted to fold under the lips on the tray on the sides thereof in register with the flanges on the cover, such flanges being attached solely to the undersides of the lips along such sides. The unflanged edges of the cover are unattached to the lips along the sides in register with such edges, thereby to form unsecured openings which permit a user to grasp the cover and readily tear it from the container. The cover is weakened as by scoring the same locally of the flanges, and preferably along the lines of fold thereof, whereby the major portion of the cover may be readily detached from the container merely by tearing the cover along such scored lines.

DESCRIPTION OF THE PREFERRED EMBODIMENT

Figure 1:
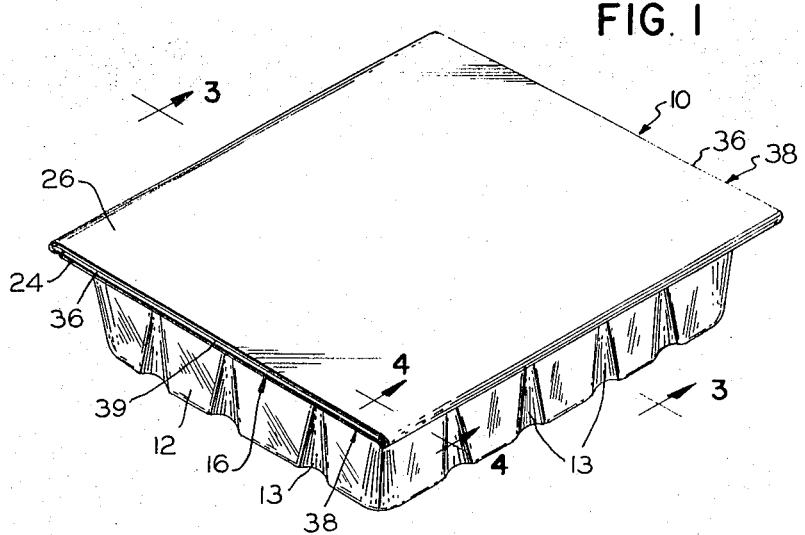
FIG. 1 is a perspective view of the upper side of a container according to the present invention.
Figure 3:
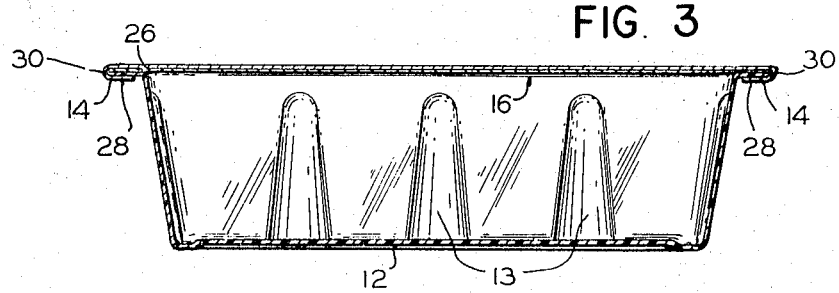
FIG. 3 is a sectional view taken on line 3—3 of FIG. 1.
Figure 2:
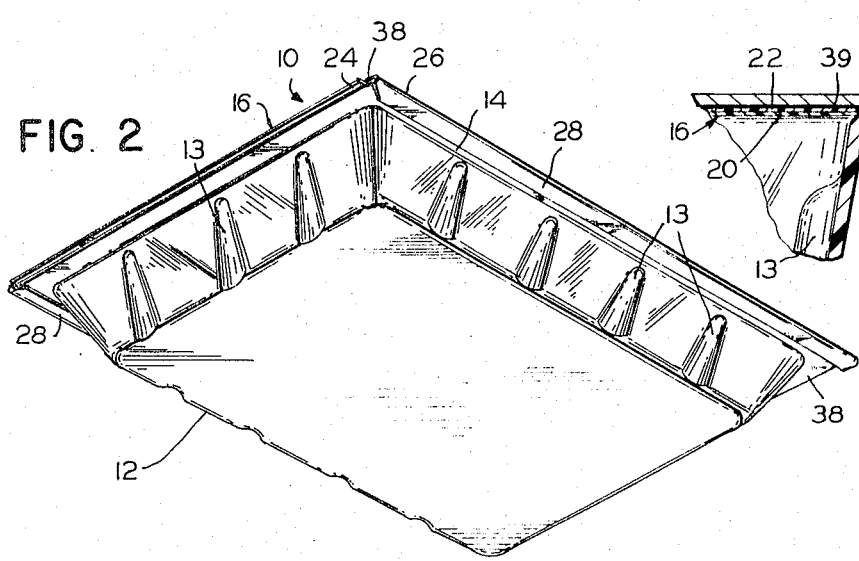
FIG. 2 is a perspective view of the lower side of the container shown in FIG. 1.
Figure 4:
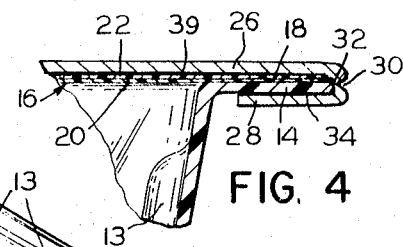
FIG. 4 is a sectional view to an enlarged scale taken on line 4—4 of FIG. 1.

Referring to the drawings, there is shown a container generally designated by the numeral 10 suitable for packaging frozen foods. Container 10 includes a dishlike tray 12 of form-sustaining or semirigid plastic in which the food is placed. Tray 12 is conveniently fabricated from thermoplastic normally solid polymers or resins, such as the polyolefins and especially high-density polyethylene, because of its superior packaging properties and heat sealability. Tray 12 is desirably formed with vertical corrugations or ribs 13 to provide sufficient strength to resist crushing thereof and to provide additional stiffness in the vertical direction.

Tray 12 is also formed with a lip 14 extending from the upper peripheral surface completely around the tray. After the contents are placed within the tray, a hermetically sealed, flexible transparent plastic closure member 16 is heat-sealed at its edges to the upper surface 18 of the lip 14.

The closure member or undercover 16 desirably is formed from a laminated plastic sheet, the lower layer 20 of which comprises a layer of polyethylene which is easily heat-sealed to the lip 14 of the tray. The upper layer 22 of the closure member 16 comprises a clear polyester resin which supplies strength to the member. An example of such is Mylar, the polyester resin film sold by duPont. Both the lower polyethylene layer 20 and the upper per Mylar layer 22 are transparent so that the contents of the tray 12 remain readily visible to the housewife. A laminated plastic film comprising layers of polyethylene and polyester resin suitable for use as the hermetically sealed closure member 16 is manufactured by Minnesota Mining and Manufacturing Co. under the trademark Scotchpak 205A.

The closure member 16 is desirably formed with an extension or tab 24 at least on one edge thereof such that the housewife may use the extension to peel the closure member from the lip 14 when access to the contents of the tray is desired.

A protective cover 26 made of fiberboard or similar heavy paper and suitable for advertising and other printed matter is disposed above the closure member 16 in a manner to protect the same. One transverse dimension of the cover is substantially equal to the distance between the edges 38 of the tray such that the edges 36 of the cover are substantially in register with the associated edges 38. The other transverse dimension of the cover exceeds the distance between the edges 32 of the tray, thus to provide for overlapping edges on the cover which can be folded along parallel lines 30 to form downwardly and inwardly bent flanges 28. Preferably the cover 26 is deeply scored along the lines 30 to facilitate first bending and then ultimate detachment along the lines of score thereby formed. The flanges 28 are folded underneath the lips 14 of the tray on the sides 32 thereof, and the undersides of the flanges are adhered to the undersides 34 of the lip 14 by a hot-melt polyethylene-based adhesive.

A feature of the invention is that the unflanged edges 36 of the cover 26 are not attached to the lips 14 along the edges 38 thereof, although substantially in register therewith, thereby providing unsecured openings 39 therealong. Such permits the major portion of the cover 26 to be readily detached from the container 10 merely by grasping the same at either of its edges 36 and tearing it along the scored lines 30.

If desired, the cover 26 may be additionally perforated along the lines 30 further to ease the removal thereof by the user.

Terms such as "side," "end," "upper," "lower," and the like have been used in the disclosure of this invention for ease of description and merely to correspond to the examples as they are illustrated in the drawings, and such terms should not be considered as limiting the scope of this invention in any way. Thus in the foregoing invention the invention has been described with reference to a particular preferred embodiment, although it is to be understood that the specific details shown are merely illustrative and that the invention may be carried out in other ways without departing from the true spirit and scope of the following appended claims.

I claim:

1. A hermetically sealed frozen food container comprising
    a dishlike tray of form-sustaining plastic containing a foodstuff therein;
    a peripherally extending lip on said tray;
    a flexible, transparent plastic sealing member secured at its edges to the upper surface of said lip to form an undercover for said tray;
    a fiberboard protective cover adapted to bear advertising material and forming a lid for said tray disposed above and freely overlying said sealing member,
    one transverse dimension of said cover being substantially equal to the corresponding underlaying transverse dimension of said tray whereby one pair of edges on said cover are substantially in register with one pair of edges on said tray,
    the other transverse dimension of said cover exceeding the corresponding underlaying transverse dimension of said tray whereby the other pair of edges on said cover overlap the other pair of edges on said tray,
    said other pair of edges on said cover corresponding underlaying transverse to provide a downwardly and inwardly extending securing flange on each side thereof;
    said cover being weakened locally along the lines of fold to facilitate ready removal of said cover from said container by tearing the same; and
    means for securing said cover to said tray solely by attaching the undersides of said flanges to the undersides of said lips on said other pair of edges on said tray, whereby the unflanged edges of said cover provide unsecured openings at said one pair of edges on said tray to permit a user to grasp said cover at either of said unflanged edges and tear the same from said container by force exerted in the direction of said one transverse dimension of said cover.

2. The container of claim 1 in which said sealing member comprises a laminated plastic member, said laminated plastic member comprising an underlayer of plastic heat sealable to said lip on said tray.

3. The container of claim 1 in which at least one edge of said sealing member extends beyond the surface of the lip to which it is secured to permit the user to peel said sealing member from said tray.

4. The container of claim 1 in which said cover is deeply scored along the lines of fold of said flanges.

5. The container of claim 4 in which said cover is perforated along said deeply scored lines of fold.

6. A method of making a hermetically sealed frozen food container, comprising
    forming a dishlike tray of form sustaining plastic having a peripherally extending lip on the top side thereof; placing a foodstuff therein;
    heat-sealing to said lip a closure film comprising a contacting layer of heat-sealable plastic and a layer of clear protective plastic thereover, said contacting layer being bonded to said lip on the upper surface thereof;
    forming a fiberboard cover having one transverse dimension of said tray, the other transverse dimension of said cover slightly exceeding the other transverse dimension of said tray so as to form overlapping opposed edges on said cover;
    placing said fiberboard cover above said closure film and bending said overlapping edges downwardly and inwardly on each side thereof to fold the same under the lips on the overlapped edges of said tray, the nonoverlapping edges on said cover being placed substantially in register with the other edges on said tray; and
    securing said cover to said tray solely by attaching the undersides of said overlapping edges to the undersides of the overlapped lips, said nonoverlapping edges of said cover being unsecured to said other edges on said tray to permit a user to grasp said cover at said unsecured edges and tear said cover from said container.

7. The method of claim 6 further comprising scoring said cover parallel to said overlapping edges along the lines of fold thereof to facilitate ready detachment of said cover from said container along said lines.

UNITED STATES PATENT OFFICE
CERTIFICATE OF CORRECTION

Patent No. 3,615,707      Dated  October 26, 1971

Inventor(s)  WILLIAM F. FILZ

It is certified that error appears in the above-identified patent and that said Letters Patent are hereby corrected as shown below:

Column 2, line 44, after "upper" delete --per--.

Claim 1, Column 3, line 41, after "cover" delete --corresponding underlaying transverse-- and insert --folded under the lips on said other pair of edges of said tray--

Claim 6, Column 4, line 29, after "dimension" insert --substantially equal to one transverse dimension--

Signed and sealed this 11th day of April 1972.

(SEAL)
Attest:

EDWARD M. FLETCHER, JR.
Attesting Officer

ROBERT GOTTSCHALK
Commissioner of Patents